UNITED STATES PATENT OFFICE.

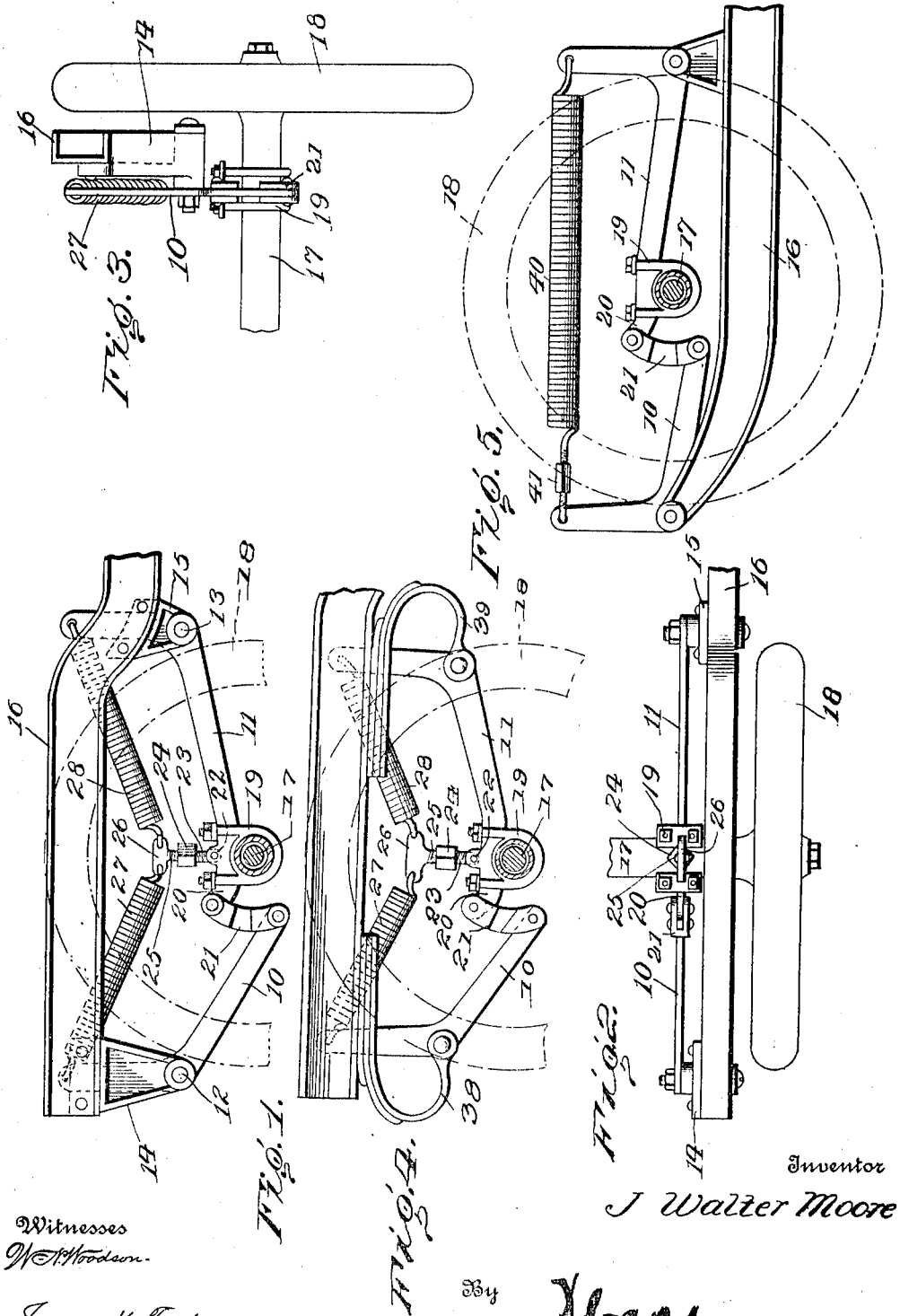

J WALTER MOORE, OF FORT EDWARD, NEW YORK.

VEHICLE-SPRING.

1,061,310.  Specification of Letters Patent.  Patented May 13, 1913.

Application filed January 14, 1911. Serial No. 602,700.

*To all whom it may concern:*

Be it known that I, J WALTER MOORE, citizen of the United States, residing at Fort Edward, in the county of Washington and State of New York, have invented certain new and useful Improvements in Vehicle-Springs, of which the following is a specification.

This invention relates to improvements in vehicles, more particularly to the spring mechanism whereby the chassis or frames of automobiles and similar vehicles are connected to the supporting axles, and has for one of its objects to improve the construction and increase the efficiency and utility of devices of this character.

Another object of the invention is to provide a device of this character having an arrangement of levers and retractive springs so arranged that the strains are uniformly distributed and to automatically adapt themselves to changes in the load of the vehicle.

With these and other objects in view, the invention consists in certain novel features of construction as hereinafter shown and described and then specifically pointed out in the claims, and, in the drawings illustrative of the preferred embodiment of the invention, Figure 1 is a side elevation of a portion of an automobile frame including the forward axle with the improvement applied and the axle in section; Fig. 2 is a plan view of the parts shown in Fig. 1 with the springs removed; Fig. 3 is an end elevation of the same; Fig. 4 is a view similar to Fig. 1, illustrating a modification in the construction; Fig. 5 is a view similar to Figs. 1 and 4, illustrating still another modification in the construction.

Corresponding and like parts are referred to in the following description and indicated in all the views of the drawings by the same reference characters.

The improved device may be applied without material structural changes to automobile frames of various forms and to frames which are located either above or below the axle, and in the various figures of the drawings, the improved device is shown for the purpose of illustration applied to various forms of automobile frames. In Figs. 1, 2, 3, and 4, the improved device is shown applied to an automobile frame having the axle beneath the frame, while in Fig. 5 the device is shown arranged above the frame.

The improved device comprises in general two L-shaped levers connected to swing at their elbows to the frame and coupled by their longer arms movably to the axle and connected by their shorter arms by retractive springs so that as the load is applied to the vehicle frame, the levers and springs co-act to produce the requisite yieldable action and are so arranged that the springs and levers automatically adapt themselves to the load upon the vehicle. The L-shaped levers are represented respectively at 10—11 and pivoted at 12—13 to brackets 14—15, the latter connected rigidly to the framework of the automobile which is represented conventionally at 16. The brackets 14—15 will vary somewhat in shape to correspond to the frame of the automobile, and it is not desired therefore to limit the invention in any manner to any specific form or arrangement of the brackets. The axle is represented conventionally at 17 and one of the wheels at 18, the latter being of the usual pneumatic construction. The axle 17 is connected rigidly to the lever 11 by a clip device 19 with one end upturned slightly as shown at 20 and coupled by a link 21 to the longer end of the lever 10.

In the structure shown in Figs. 1 and 4 a rod 23 is connected at 22 to the lever 11 and having a right-handed thread and engaging in a threaded sleeve 24, and a similar rod 25 having a left hand thread engages a left hand threaded socket in the opposite end of the sleeve 24. By this means, it will be obvious that by rotating the sleeve 24, the rods 23—25 may be adjusted toward each other or away from each other as required. At its upper end, the rod 25 is provided with a coupling link 26 to which the inner ends of two springs 27—28 are coupled, the outer ends of the springs being in turn coupled to the free ends of the shorter arms of the levers 10—11. By this arrangement, it will be obvious that when a load is applied to the frame 16, the downward movement produced thereby will cause the longer arms of the levers 10—11 to be elevated and the shorter arms to be moved away from each other and thus apply strain upon the springs 27—28, or to cause the shorter arms of the levers to be moved away from each other.

When these movements take place, it will be obvious that the link 21 permits the movements without producing cramping between the parts which would otherwise occur. The tension of the springs 27—28 may be readily controlled by manipulating the sleeve 24, and thus shortening or lengthening the springs, as will be obvious.

In Fig. 4 a modified construction is shown consisting in substituting springs 38—39 for the rigid brackets 14—15, the springs being riveted or otherwise firmly secured to the frame 16 and with the L levers 10—11 mounted to swing upon the free ends of the springs, as shown. Otherwise the construction is the same as that shown in Fig. 1.

In Fig. 5 a slightly modified arrangement of the retractive spring is shown consisting in dispensing with one of the retractive springs and connecting a single spring 40 directly to the shorter ends of the L levers. In this arrangement also a right and left handed turn buckle adjusting device is employed, as represented at 41, to enable the tension of the spring to be changed as required.

These various modifications do not constitute departures from the spirit of the invention or sacrifice any of its advantages, as the operation and the results produced are substantially the same in all of the different forms.

All of the parts of the improved device are of metal, preferably of steel and as light as possible consistent with the strains to which they will be subjected when in use.

Having thus described my invention, what I claim as new is:

1. The combination with a vehicle including a frame and axle, of a lever rigidly connected intermediate its ends to said axle and pivoted at one point to said frame, another lever pivoted intermediate its ends to said frame, a link coupling said last-mentioned lever to said first-mentioned lever, and springs connected respectively to said levers.

2. The combination with a vehicle including a frame and axle, of a lever rigidly connected intermediate its ends to said axle and pivoted at one point to said frame, another lever pivoted intermediate its ends to said frame, a link coupling said last-mentioned lever to said first-mentioned lever, a coupling device connected to said rigidly connected lever, and springs connected respectively to said levers and to said coupling device.

In testimony whereof, I affix my signature in presence of two witnesses.

J WALTER MOORE. [L. S.]

Witnesses:
MARION R. MOORE,
GEORGE R. STEVENS.

---

Copies of this patent may be obtained for five cents each, by addressing the "Commissioner of Patents, Washington, D. C."